United States Patent [19]
Kostusiak

[11] Patent Number: 5,233,640
[45] Date of Patent: Aug. 3, 1993

[54] SECURITY SYSTEM WITH BACKUP DIALER

[75] Inventor: Karl H. Kostusiak, Pittsford, N.Y.

[73] Assignee: Detection Systems, Inc., Fairport, N.Y.

[21] Appl. No.: 641,129

[22] Filed: Jan. 11, 1991

[51] Int. Cl.$^5$ ............................................. H04M 11/04
[52] U.S. Cl. ................................................. 379/39; 379/42
[58] Field of Search ................. 379/38, 39, 37, 40, 379/41, 42, 106; 340/507

[56] References Cited

U.S. PATENT DOCUMENTS

| | | | |
|---|---|---|---|
| 4,138,670 | 2/1979 | Schneider et al. | 340/507 |
| 4,148,020 | 4/1979 | Siemer | 379/40 |
| 4,278,841 | 7/1981 | Regennitter et al. | 379/40 |
| 4,465,904 | 8/1984 | Gottsegen et al. | 379/96 |
| 4,521,643 | 6/1985 | Depuis et al. | 379/50 |
| 4,741,022 | 4/1988 | Chebra et al. | 379/39 |

*Primary Examiner*—James L. Dwyer
*Assistant Examiner*—Stella L. Woo

[57] ABSTRACT

A security apparatus having two control and communications units adapted to monitor a system and to establish communications over a connected telephone line and to transmit an alarm upon the occurance of a predetermined event in the system. The first control and communications unit produces a characteristic signal when it is operational; and the second control and communications unit is adapted to monitor the characteristic signal produced by the first control and communications unit and to establish communications over the connected telephone line and transmit an alarm upon interruption of the characteristic signal. The characteristic signal is preferably a tone of predetermined frequency.

9 Claims, 3 Drawing Sheets

SECURITY SYSTEM WITH BACKUP DIALER

BACKGROUND OF THE INVENTION

Cross-Reference to Related Application

Reference is made to my commonly assigned, co-pending U.S. patent application Ser. No. 07/580,079 entitled SECURITY SYSTEM WITH SIMPLIFIED INSTALLATION, filed Sep. 4, 1990, now abandoned.

1. Technical Field

This invention relates generally to security, fire, energy control, message, and similar systems (collectively referred to herein as "security systems") which have in common that they are connected to the public switched telephone network for outbound communications; and more particularly to such security systems wherein unauthorized disruption, whether intentional or unintentional, cannot be tolerated.

2. Background Art

Typically, such systems have been installed on the monitored premises as an integral unit consisting of a single housing having a controller, a power supply, communication circuitry connected to the public telephone network, and a user interface such as a keypad or other control panel. While such systems were easily installed, they had to be readily accessible to the user; and thus were easily found by unauthorized persons, such as intruders. Once located, the system was vulnerable to being disabled before an alarm could be transmitted. Also, for convenience and simplification of installation, the unit was sometimes mounted such that accidental destruction or injury to the the unit was possible, especially if heavy equipment was used in the area.

These problems associated with integral unit systems have been solved in the prior art by splitting the functions between an easily accessible user interface and a remote, often hidden, control and communications unit installed in a generally inaccessible area. While such split installations overcome the security problems associated with vulnerable integral units, split installations require special wiring from the control and communications unit to the user interface. This often slows installation and requires specially trained installers. In some municipalities, this also involves the mandatory use of union personnel at significant expense.

Access to house power and a telephone line at the hidden control and communications unit is required. If house power is not available at the selected control and communications unit site near the telephone line entrance point, rewiring is required. Electrical wiring must conform to electrical codes, and most municipalities require inspection after any changes. Licensed electricians are required to perform the changes in most cases, adding yet another cost to the installation of the security system.

DISCLOSURE OF INVENTION

It is an object of the present invention to alleviate the requirements for costly modifications of existing installed telephone and power wiring at a site where a security system is to be installed, while providing a high degree of immunity to unauthorized disruption to any one part of the system, whether intentional or unintentional.

It is another object of the present invention to provide a security system wherein an installer need not modify any of the telephone wiring present at the installation site, and can locate the control and communications unit near any convenient telephone and power outlet while minimizing the risk of disablement of the system by unauthorized disruption to any one part thereof.

It is still another object of the present invention to provide a high level of tolerance to an attempt to disable the security system by providing a backup control and communications unit to monitor the operation of the main control and communications unit and to send an alarm signal over the telephone line upon detection of a loss of the main control and communications unit.

It is yet another object of the present invention to provide a high level of tolerance to an attempt to disable the security system by providing a backup control and communications unit to monitor the operation of the main control and communications unit and for the main control and communications unit to likewise monitor the backup control and communications unit such that an alarm signal is sent over the telephone line upon detection of a loss of either the main or the backup control and communications unit.

According to these and other objects, an embodiment of the present invention includes a security apparatus having two control and communications units adapted to monitor a system and to establish communications over a connected telephone line for transmitting an alarm upon the occurance of a predetermined event in the system. The first control and communications unit produces a characteristic signal when it is operational; and the second control and communications unit is adapted to monitor the characteristic signal produced by the first control and communications unit and to establish communications over the connected telephone line and transmit an alarm upon interruption of the characteristic signal. The characteristic signal is preferably a tone of predetermined frequency.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

Figure 1:
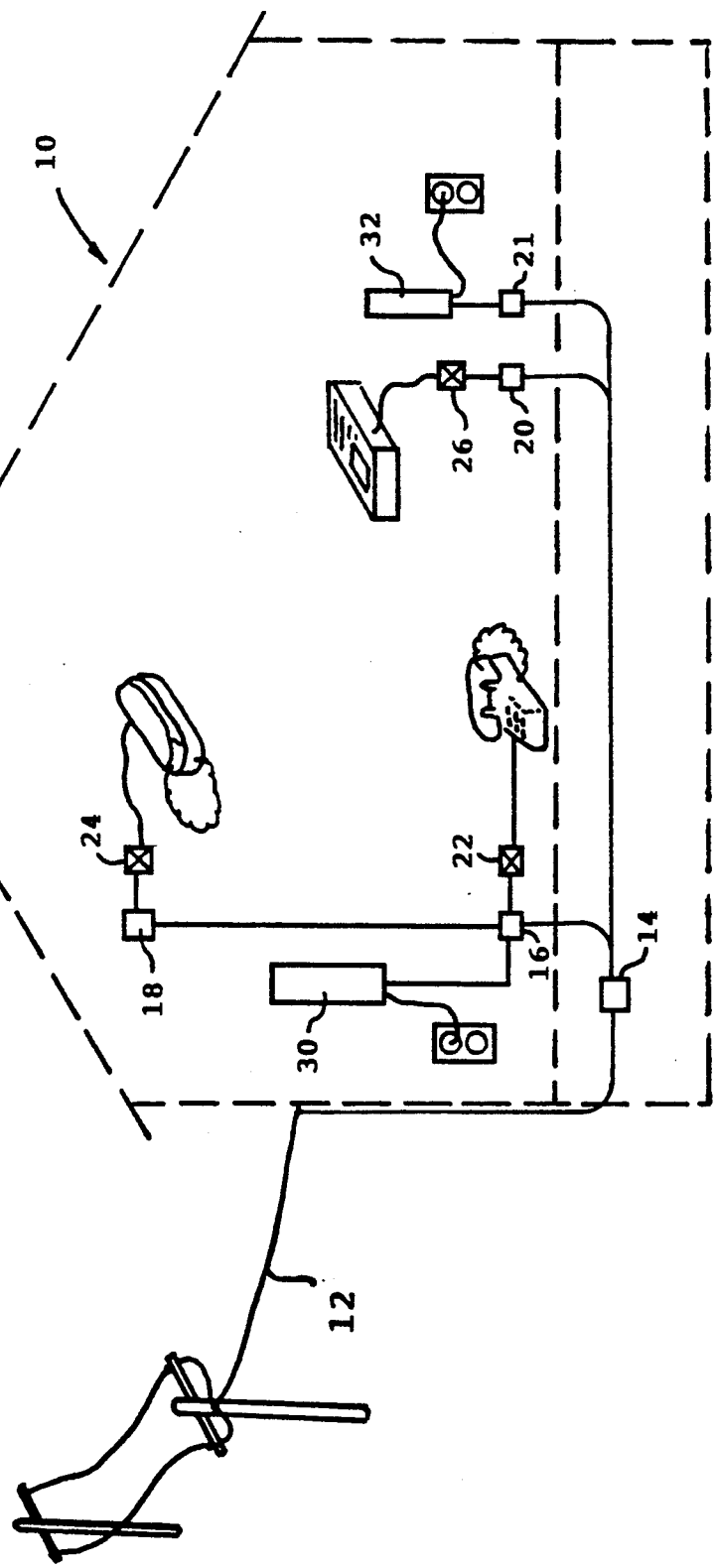
FIG. 1 is a schematic illustration of a typical application of the present invention.

FIG. 1 shows a typical application of the present invention. At a site 10 where an installation is to be made, there is a telephone line 12 entering the premise at 14. The telephone line is routed to all connectors 16, 18, 20, and 21 for equipment throughout the site. Just as examples, connectors 16 and 18 are illustrated as having telephone hand sets attached, and connector 20 has been provided with an answering machine.

During operation of the security system, it might be necessary to interrupt other users of the telephone line. This is accomplished by installing disabler units 22, 24, and 26 at every telephone outlet to be interrupted. Suitable disabler units are described in my commonly assigned, co-pending U.S. patent application Ser. No. 07/580,079 entitled SECURITY SYSTEM WITH SIMPLIFIED INSTALLATION, filed on Sep. 4, 1990, now abandoned the disclosure of which is incorporated herein by reference.

A main control and communications unit 30 is installed at a location where there is ready access to a telephone connector and a house power outlet. As illustrated, the telephone connector may be shared with other devices. A backup control and communications unit 32 is installed at a second location, also where there is ready access to a telephone connector and a house power outlet. Using widely available modular telephone jacks, installation can be performed in minutes without altering either telephone or power wiring by individuals having only minimum installation training.

Generally, control and communications units 30 and 32 will be in different physical areas of a site so that they cannot readily be simultaneously disabled. As will be explained, the backup control and communications unit monitors the main control and communications unit so that disablement of the main unit will cause an alarm condition on the backup unit. In another embodiment of the invention, each control and communications unit monitors the other so that disablement of either unit will cause an alarm condition on the other unit.

Figure 2:
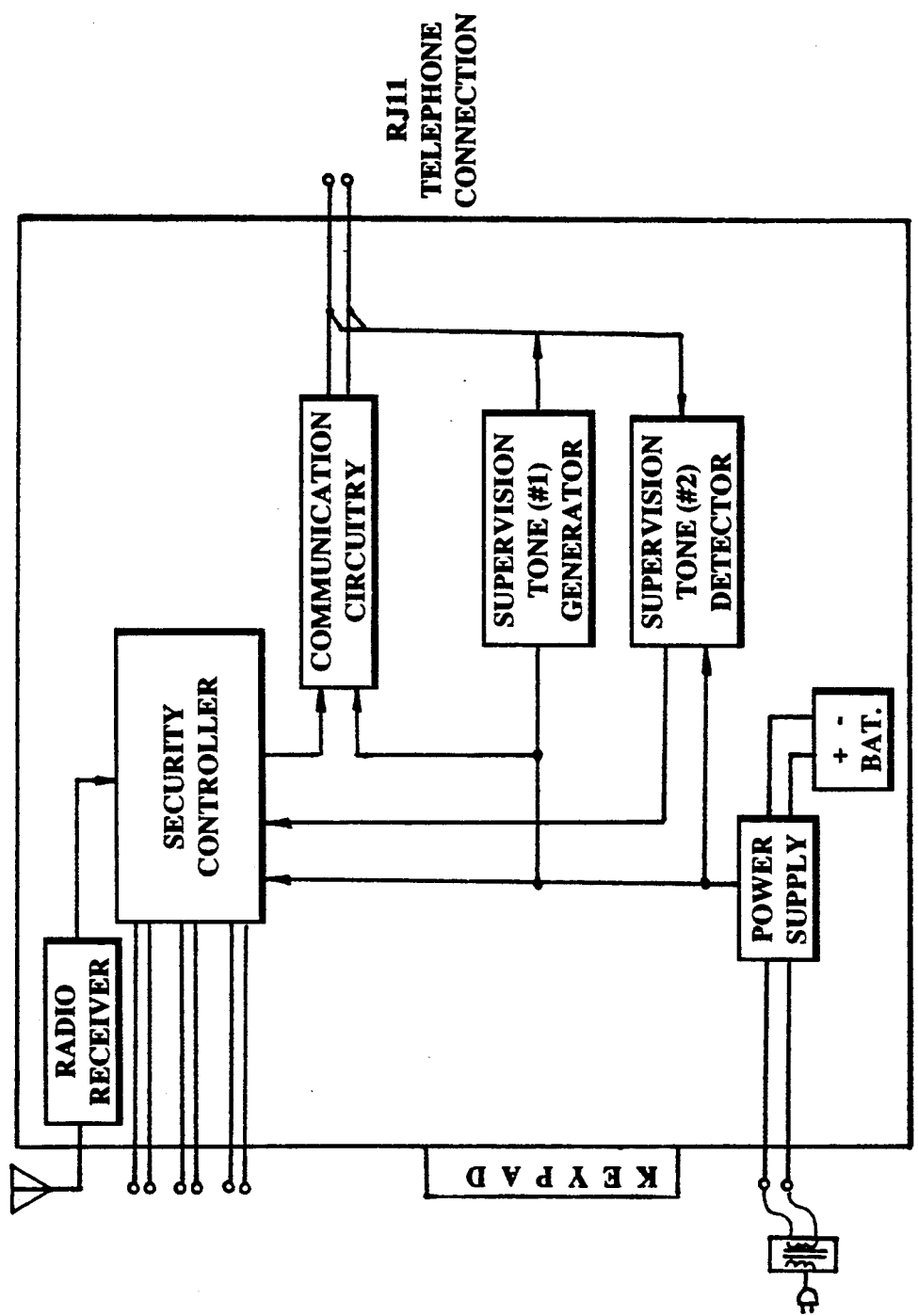
FIG. 2 is a schematic view of a main control and communications unit according to a preferred embodiment of the present invention.

Referring to FIG. 2, a main control and communications unit according to a preferred embodiment of the present invention includes a security controller 34. Controller 34 may be of any conventional construction, such as those known controllers which include a microprocessor and/or application specific hardware for monitoring security zone connections 36 and/or a radio receiver 38 to receive information from motion detectors, door or window switches, or other transducers which indicate an intrusion or other monitored event. A user interface 40, such as a key pad, communicates setup commands and other instructions to the controller. Controllers such as shown are usually powered from a step-down transformer 42 connected to house power, with a back-up battery supply 44.

In operation, when a monitored event signal is received, controller 34, running appropriate software, makes the decision that an alarm message must be sent. Exclusive access to the telephone is gained by issuing a command over the telephone line via communication circuitry 46 which causes disabler units 22, 24, and 26 to activate, thereby disconnecting all other telephone line connected equipment. Next, the controller seizes the telephone line, establishes communications, and sends the alarm message. The disablers reconnect the telephone devices to the line after a predetermined period of time.

Main control and communications unit 30 further includes a supervision tone generator 48 and, optionally, a supervision tone detector 50 which is tuned to a tone different from the tone emitted by generator 48. If a tone detector is provided, it monitors the telephone line for the presence of the supervised tone. Interruption of the tone causes an appropriate signal to be sent to controller 34; causing the generation of an alarm signal. The alarm signal may be generic, indicating system trouble, or, if one of the sensor inputs 36 is also activated, the alarm signal may be specific to the event.

Figure 3:
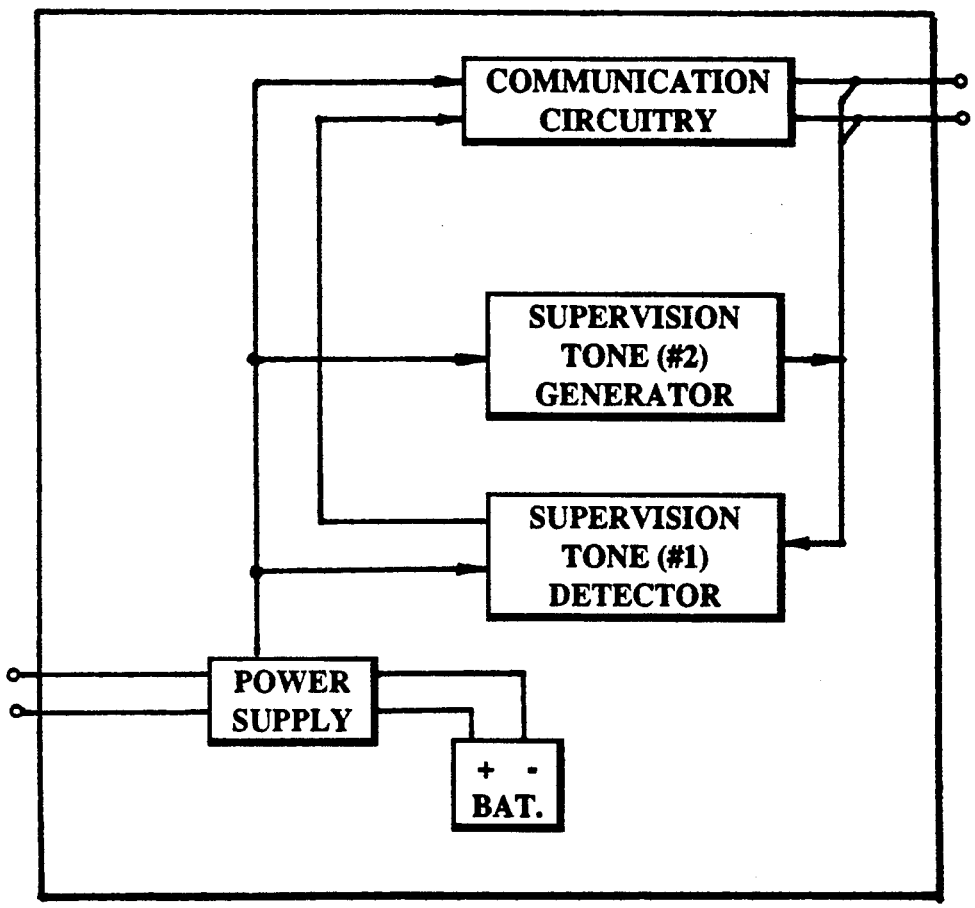
FIG. 3 is a schematic view of a backup control and communications unit according to a preferred embodiment of the present invention.

FIG. 3 illustrates a typical backup control and communications unit 32. A supervision tone detector 52 monitors the telephone line for the presence of the tone emmitted by supervision tone generator 48 of main control and communications unit 30. Interruption of the tone causes an appropriate signal to be sent to a communicator circuit 54, causing the generation of an alarm signal. Thus, if the supervision signal emitted by the main control and communications unit is caused to discontinue, such as by action of an intruder, the backup control and communications unit would make a call with alarm information.

If main control and communications unit is provided with supervision tone detector 50 and backup control and communications unit is provided with a supervision tone generator 56, the main control and communications unit can be used to monitor the backup control and communications unit. Of course the tones would have to be different.

The invention has been described in detail with particular reference to preferred embodiments thereof, but it will be understood that variations and modifications can be effected within the spirit and scope of the invention. For example, the control and communication units are described as monitoring one another by way of tones transmitted over existing telephone lines, but other forms of communication will readily occur to those skilled in the art. For example, monitoring may be effected by way of infrared light, radio signals, power line carrier current signal, light signals, etc. Backup control and communication unit 32 may be provided with a key pad for user interface, and may also include sensor inputs so that an alarm which is sent out when the main control and communications unit is disabled can be specifically related to any sensed event.

What is claimed is:

1. Security apparatus comprising:
   a first control and communications unit adapted to monitor a system and to establish communications over a connected telephone line and to transmit an alarm upon the occurance of a predetermined event in the system, said first control and communications unit having means for producing a characteristic signal when the first control and communications unit is operational; and
   a second control and communications unit adapted to monitor the characteristic signal produced by said first control and communications unit and to establish communications over said connected telephone line and transmit an alarm upon interruption of said characteristic signal.

2. Security apparatus as defined in claim 1 wherein each control and communications unit has its own power supply adapted to operate from a standard house power outlet.

3. Security apparatus as defined in claim 1 wherein:
   said means for producing a characteristic signal includes a tone generator for placing a predetermined frequency signal on the connected telephone line whenever the first control and communications unit is operational; and
   said second control and communications unit includes (1) a tone detector tuned to said predetermined frequency and (2) means operatively connected to said tone detector for establishing communications over the connected telephone line and for generating an alarm signal on the connected telephone line upon interruption of operation of said tone generator.

4. Security apparatus as defined in claim 1 wherein at least said first control and communications unit includes a user interface for communicating operating instructions.

5. Security apparatus as defined in claim 3 wherein said predetermined frequency signal is outside the frequency band used by public telephone service.

6. Security apparatus comprising:
a first control and communications unit adapted to monitor a system and to establish communications over a connected telephone line and to transmit an alarm upon the occurance of a predetermined event in the system, said first control and communications unit having means for producing a first characteristic signal when the first control and communications unit is operational;
a second control and communications unit adapted to monitor the first characteristic signal and to establish communications over the connected telephone line and transmit an alarm upon interruption of said first characteristic signal, said second control and communications unit having means for producing a second characteristic signal when the second control and communications unit is operational; and
means, associated with said first control and communications unit for monitoring the second characteristic signal and to establish communications over the connected telephone line and transmit an alarm upon interruption of said second characteristic signal.

7. Security apparatus as defined in claim 6 wherein:
said means for producing said first and second characteristic signals include tone generators for placing predetermined frequency signals on the connected telephone line whenever the first and second control and communications units, respectively, are operational; and
said first and second control and communications units each include (1) a tone detector tuned to the predetermined frequency of the other control and communications unit and (2) means operatively connected to said tone detector for establishing communications over a connected telephone line and for generating an alarm signal on the connected telephone line upon interruption of operation of said tone generator of the other control and communications unit.

8. Security apparatus as defined in claim 7 wherein said tone generators produce respectively different first and second characteristic signal frequencies.

9. A method for detecting an alarm condition and for transmitting an alarm signal over a telephone line, said method comprising the steps of:
establishing communications over a connected telephone line with communication circuitry;
monitoring a system while producing a characteristic signal over the connected telephone line;
transmitting an alarm over the connected telephone line upon the occurance of a predetermined event in the system;
interrupting the production of the characteristic signal over the connected telephone line when communication over the connected telephone line is interrupted; and
monitoring the characteristic signal on the connected telephone line and establishing communications over the connected telephone line and transmitting an alarm upon interruption of said characteristic signal.

* * * * *